(12) United States Patent
Campbell (10) Patent No.: US 7,609,308 B2
(45) Date of Patent: Oct. 27, 2009

(54) COLOR FILTER ARRAY AND MICROLENS ARRAY

(75) Inventor: Scott Patrick Campbell, Thousand Oaks, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 1008 days.

(21) Appl. No.: 10/814,176

(22) Filed: Apr. 1, 2004

(65) Prior Publication Data

US 2004/0183938 A1    Sep. 23, 2004

Related U.S. Application Data

(63) Continuation of application No. 09/990,884, filed on Nov. 21, 2001, now Pat. No. 6,738,171.

(51) Int. Cl.
*H04N 3/14* (2006.01)
*H04N 5/335* (2006.01)

(52) U.S. Cl. ........................ 348/294; 348/302

(58) Field of Classification Search ............... 348/294, 348/302; 359/1, 15; 257/432, 435
See application file for complete search history.

(56) References Cited

U.S. PATENT DOCUMENTS

| | | | |
|---|---|---|---|
| 5,526,145 A * | 6/1996 | Weber | 359/15 |
| 5,764,389 A | 6/1998 | Grinberg | |
| 5,923,796 A | 7/1999 | Feldman | |
| 6,020,985 A | 2/2000 | McLeod | |
| 6,057,538 A | 5/2000 | Clarke | |
| 6,081,018 A | 6/2000 | Nakashiba | |
| 6,081,354 A * | 6/2000 | Gambogi et al. | 359/15 |
| 6,274,917 B1 * | 8/2001 | Fan et al. | 257/432 |
| 6,433,844 B2 | 8/2002 | Li | |
| 6,727,521 B2 * | 4/2004 | Merrill | 257/98 |
| 6,738,171 B1 * | 5/2004 | Campbell | 359/15 |

* cited by examiner

*Primary Examiner*—James M Hannett
(74) *Attorney, Agent, or Firm*—Dickstein Shapiro LLP (57) ABSTRACT

Semiconductor imaging devices with integrated holographic optical elements for beam focusing and color separation.

33 Claims, 5 Drawing Sheets

COLOR FILTER ARRAY AND MICROLENS ARRAY

This application is a continuation of application Ser. No. 09/990,884, filed Nov. 21, 2001 now U.S. Pat. No. 6,738,171, the entire disclosure of which is incorporated by reference herein.

BACKGROUND

This application relates to holographic optical elements, and more particularly, to color filter arrays and microlens arrays formed from holographic optical elements for use in radiation sensor arrays.

Semiconductor radiation sensors can be fabricated on a common semiconductor substrate to form a sensing array. Each radiation sensor is responsive to radiation to produce an output that is a measurement of the amount of received radiation. An input optical device, such as a lens array or an optical filter array, may be placed in the input optical path of the input radiation to control or manipulate the input radiation in order for the input radiation to be properly received by the sensor pixels of the sensing array.

SUMMARY

This application includes designs and techniques for using holographic optical elements to form an optical mask layer for modifying input radiation to a sensor array. Each holographic optical element is spatially associated with a sensor pixel of the sensor array and may be formed on top of a sensor or buried in the pixel layers of each sensor. The holographic optical elements may be optically reflective, absorptive, refractive, or diffractive in nature when interacting with input radiation.

In one implementation, holographic optical elements of the optical mask layer are designed as micro lenses to respectively focus input radiation into their respective sensors. In another implementation, holographic optical elements of the optical mask layer are designed as a color filter array where each holographic optical element filters different spectral bands of received radiation for a color sensing array. For example, each holographic optical element may be an optical grating that separates input radiation into different beams at different wavelengths to different directions. The grating patterns are designed to direct the beams at different wavelengths to different adjacent sensors to produce color images.

DETAILED DESCRIPTION

Semiconductor image sensor arrays may be designed to provide high-spatial-resolution sensing capability by implementing small sensing pixels. Each fundamental sensor pixel includes a photosensitive element that absorbs input radiation to produce electric charges representative of the amount of received radiation. The radiation-induced charges are then read out in form of an electric current or voltage to produce a pixel output. Various types of photosensitive elements may be used, including but not limited to, CCD sensors, photodiode sensors, and photogate sensors.

In one implementation, active pixel sensor pixels may be used to form active image sensing arrays by converting input radiation energy into electrical signals. Each active pixel sensor pixel generally includes a photoreceptor and a pixel circuit with several associated transistors that provide in-pixel signal processing functions such as signal conversion from electric charges into a current or voltage, signal reset, or signal amplification. See, e.g., U.S. Pat. No. 5,471,515 to Fossum et al.

Image sensor arrays may be designed to produce monochromatic images or color images. In a monochromatic images, each sensor pixel may be used to produce an image pixel in the output image. Hence, the number of image pixels in the output image is up to the number of sensor pixels in the array. A color image sensor array, however, uses two or more different adjacent pixels as a single "color pixel" where different pixels in the color pixel respectively sense light of different colors in the output radiation to produce a colored image pixel in the output image. For example, a color pixel may include three adjacent sensor pixels corresponding to the three primary colors of red, green, and blue. For example, a color pixel may include two green pixels, one red pixel, and one blue pixel in a Bayer pattern.

This application teaches optical mask layers based on an array of holographic optical elements (HOEs) to process the input radiation for detection by an image sensing array. Two basic optical mask layers may be formed from a HOE array. One is a optical mask layer with a HOE array designed to allow each HOE to operate as a microlens for focusing a spatial part of the input radiation on to a photoreceptor in a sensor pixel corresponding to the HOE. Another is a color filter array where each HOE is designed to filter different spectral bands of received radiation for a color sensing array. In addition, a HOE optical mask layer may be designed and fabricated to combine both the optical focusing and color filtering operations into each HOE.

A holographic optical element may be optically reflective, absorptive, refractive, or diffractive in nature when interacting with input radiation. Notably, a holographic optical element may be fabricated in planar layer designs with surface features by using surface patterning techniques including those widely used in semiconductor fabrication. In contrast to the conventional optical fabrication, complex fabrication of curved optical surfaces is eliminated in holographic optical elements. In particular, this application teaches that HOEs can be integrated with other layers fabricated over a substrate for forming the sensor pixels. Hence, the fabrication of the HOEs and fabrication of the sensor pixels of the image sensing array may be integrated into fabrication steps in a single fabrication process.

Holographic optical elements are formed of holograms which may be simplified as optical grating patterns. In operation, the grating patterns break up a received input wave into multiple waves and combine the multiple waves into new waves with desired optical properties. Depending on specific requirements of applications, the grating patterns may be designed to carry out functions of many conventional optical devices such as optical diffractive gratings, optical lenses, and optical filters, and other functions that may be difficult or impractical to achieve with conventional optical devices.

Such grating patterns in HOEs may be fabricated in a wide range of materials, including metals such as aluminum, dielectric materials such as crystals (e.g. silicon) and non-crystal materials (e.g., glasses, silica, plastics).

One advantageous feature of HOEs for an optical mask layer for an image sensing array is that each HOE may include different sets of holograms for simultaneously performing different optical functions. For example, a hologram for a lens function and a hologram for a color filter function may be included in a single HOE to operate independently from each other without interference between the two different optical functions. In comparison, conventional optical designs generally require a lens array and a separate filter array stacked over each other on top of the sensing array.

Figure 1:
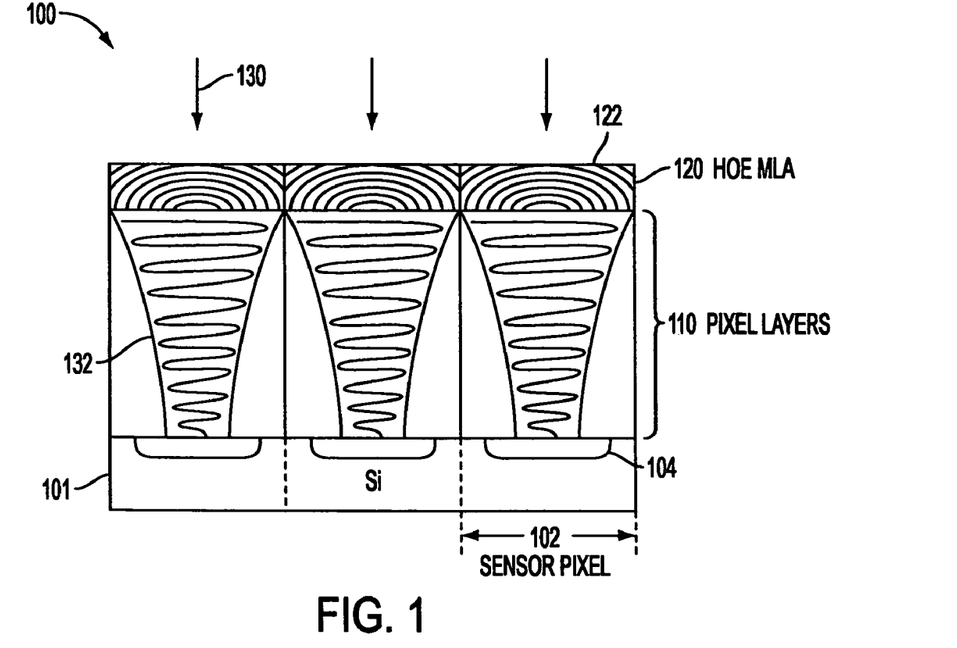
FIGS. 1, 2, and 3 show exemplary image devices with integrated holographic optical elements for beam focusing to increase collection efficiency and to reduce spatial cross talk between adjacent sensor pixels.
Figure 2:
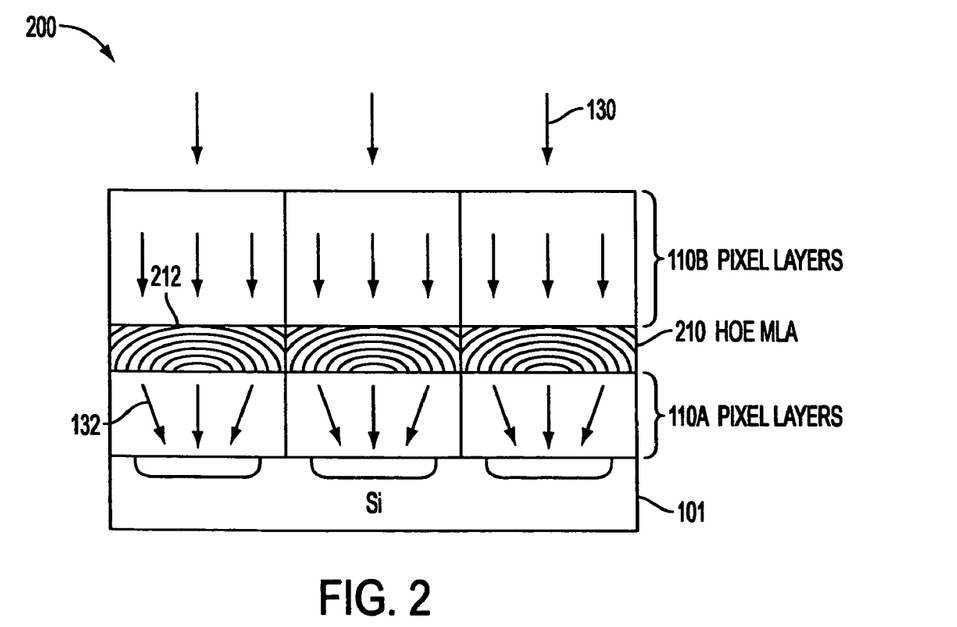
Figure 3:
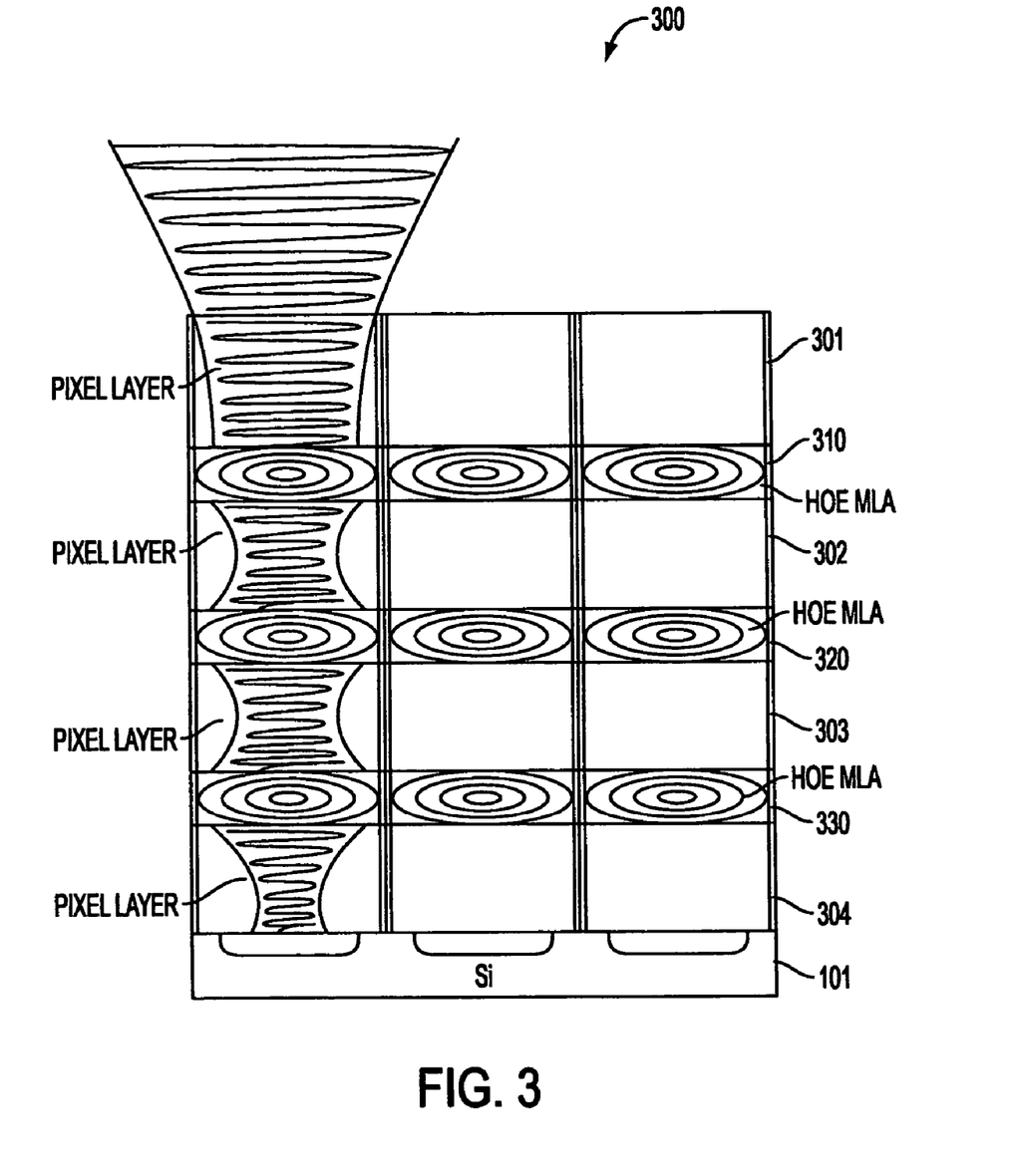
Figure 6:
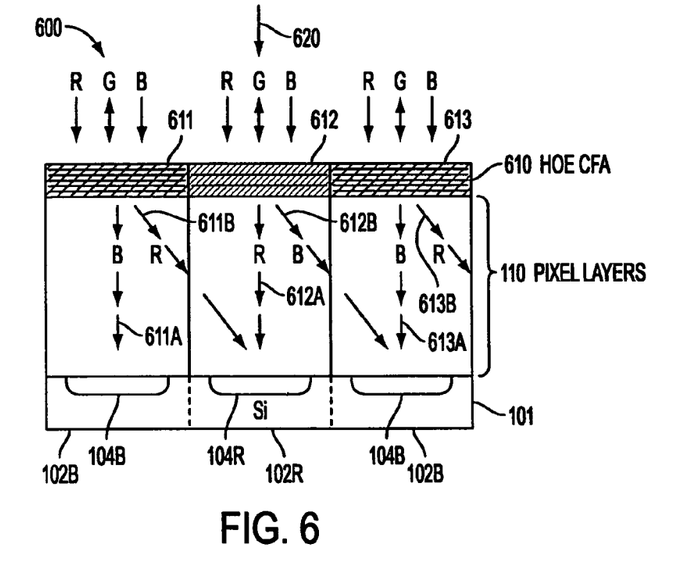
Figure 7:
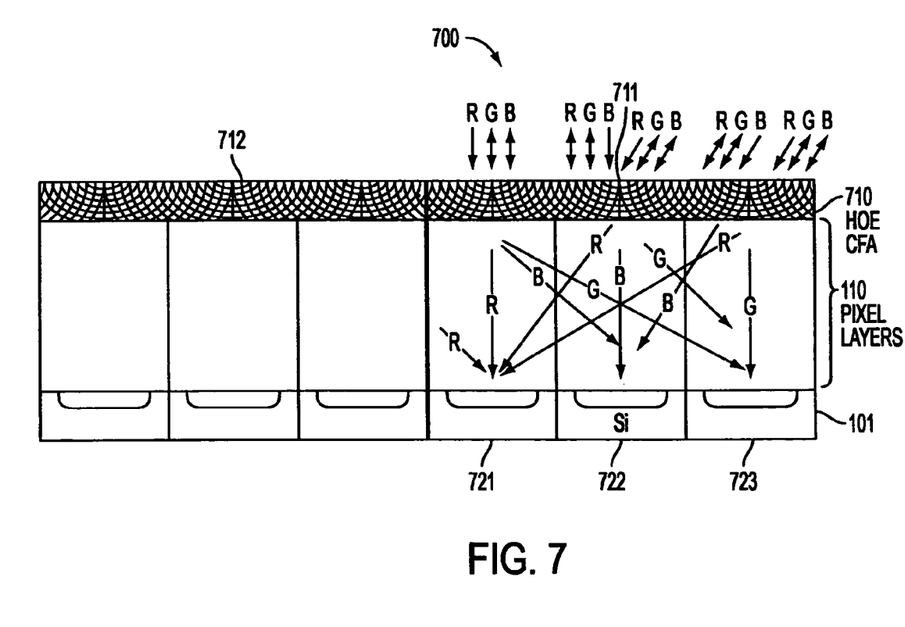
Figure 8:
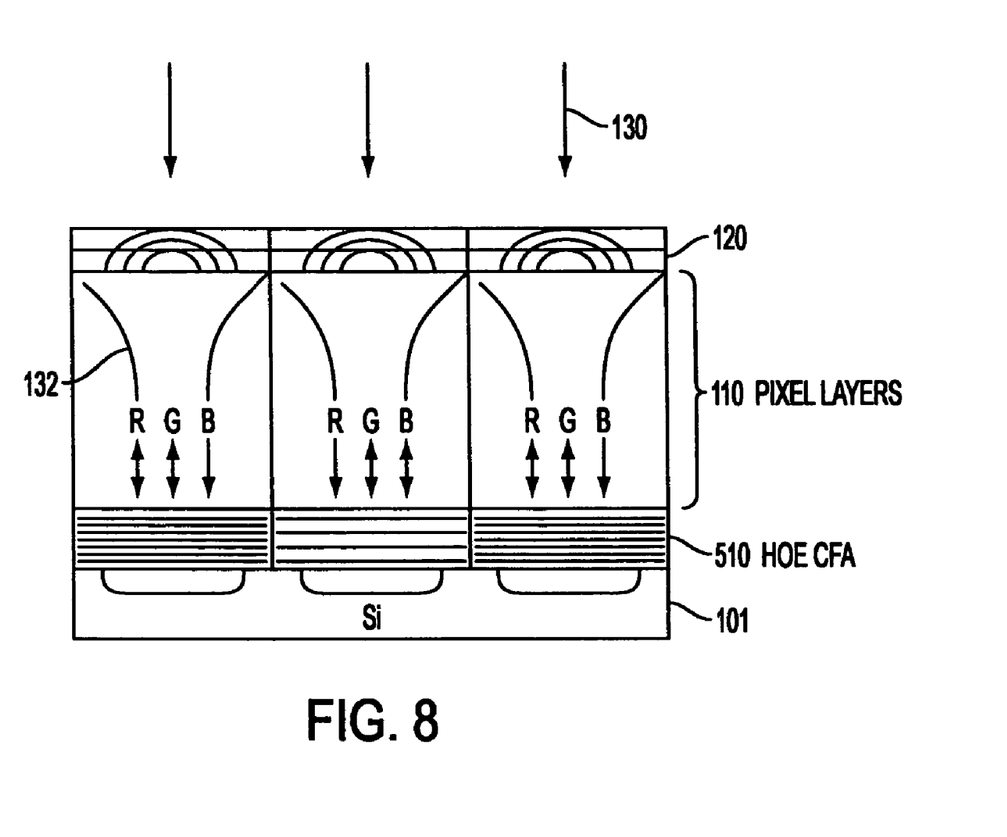
FIG. 8 shows one embodiment of a color image device with one integrated holographic optical element layer for beam focusing and another separate integrated holographic optical element, layer for color filtering.

The following describes exemplary embodiments semiconductor imaging devices integrated with HOEs with reference to FIGS. 1 through 8. FIGS. 1 through 3 illustrate embodiments of HOE lens arrays integrated to sensing arrays. FIGS. 4 through 7 illustrate embodiments of HOE color filter arrays integrated to sensing arrays. FIG. 8 shows two separate HOE mask layers with one for coloring filtering and one for beam focusing in a sensing array.

FIG. 1 shows a first embodiment of a semiconductor image device 100 having an HOE optical mask layer 120 as a lens array. The device 100 is formed over a substrate 101 formed of a suitable semiconductor material (such as Si). The active area of the substrate 101 has pixels 102 arranged in a 1-dimensional or 2-dimensional array. Each pixel 102 has a photoreceptor area 104 which is photosensitive and absorbs input radiation. Each pixel 102 also includes pixel layers 110 which are fabricated through semiconductor fabrication to form in-pixel circuit elements such as electrodes for the photoreceptor. For active pixel sensors, the in-pixel circuit elements include transistors for the signal conversion or amplification. The HOE optical mask layer 120 is formed over the top surface of the pixel layers 110 and is spatially patterned into HOE lens pixels 122 that respectively cover the underlying sensor pixels. The hologram in each HOE lens pixel 122 is designed to operate as a lens to focus the received beam to the photoreceptor area 104 of each pixel area 102 in the substrate 101. The hologram in each HOE lens pixel 122 is spatially continuous from one edge of the HOE to the other edge so that the fill factor of the HOE lens array is essentially 100%.

The holograms in the HOEs 122 separately focus the input radiation 130 intro multiple beams 132 respectively directed to the photoreceptor areas 104 in different pixels. The location of each photoreceptor area 104 may be either located in the center of each pixel area 102 or off the center of each sensor pixel. In the latter case, the hologram in each HOE lens element 122 may be designed to focus the beam 132 at the off-center location to maximize the collection efficiency.

FIG. 2 shows another image device 200 where a HOE lens mask layer 210 is formed in the middle of the pixel layers between a first set of contiguous pixel layers 110A directly formed over the substrate 101 and a second set of contiguous pixel layers 110B. In comparison with the image device 100 in FIG. 1, the HOE layer 210 with HOE pixels 212 is "buried" in the pixels layers. Such buried HOE design can be used to provide design flexibility.

FIG. 3 shows an imaging device 300 that uses two or more separate and spaced HOE lens layers to achieve desired optical focusing and imaging performance. In the illustrated example, three buried HOE lens layers 310, 320, 330 are formed amongst the pixel layers 301, 302, 303, 304. The beam size of received radiation in each pixel successively decreases by passing through the HOE layers.

Figure 4:
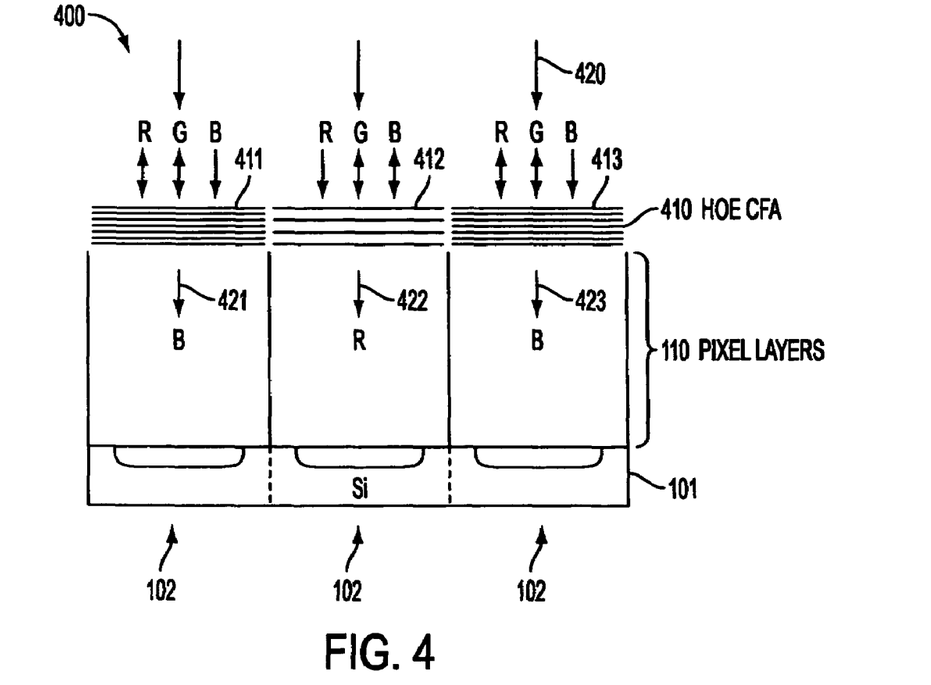
FIGS. 4, 5, 6, and 7 show exemplary color image devices with integrated holographic optical elements for color filtering.
Figure 5:
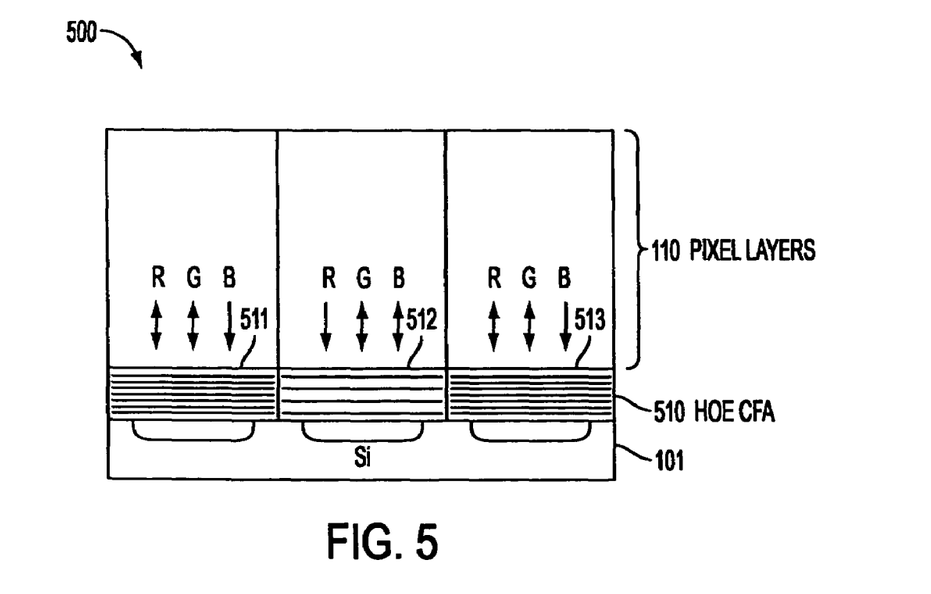

FIG. 4 shows a first embodiment of a color image device 400. A HOE color filter array (CFA) 410 is formed on top of the pixel layers 110. Different adjacent HOEs 411, 412, 413, etc. have different holograms to selectively transmit light of different spectral bands, 421, 422, 423, etc., respectively, from an input radiation scene 420. Accordingly, the corresponding pixels 102 receive and detect different colors in the input scene 410. FIG. 5 shows another color image device 500 in which a HOE color filter array 510 is directly formed on top of the substrate 101 and underneath the pixel layers 110. Similar to FIG. 4, different adjacent HOEs 511, 512, 513, etc. have different holograms to transmit light of different spectral bands without significantly changing the direction of each beam. The HOE layer 410 or 510 may be formed of a dielectric stack to provide spatial variations along the growth direction of the layers over the substrate 101.

FIG. 6 shows a third embodiment of a color image device 600. An optically diffractive or refractive HOE mask layer 610 is formed on top of the pixel layers 110 and is thus spaced from the substrate 101. Like the HOE pixels in the HOE layers 410 and 510, HOEs 611, 612, 613, etc. in the HOE layer 610 are spatially scaled to cover only the respective sensor pixels. However, different from the HOE pixels in the HOE layers 410 and 510, HOEs 611, 612, 613, etc. in the HOE layer 610 diffract or refract light of different spectral bands into different directions to different sensor pixels. For example, the hologram in the HOE pixel 611 diffracts or refracts received radiation 620 into a first colored beam 611A in a first spectral band (e.g., blue) to the underlying photoreceptor area 104B of the pixel 102B and a second colored beam 611B in a second different spectral band (e.g., red) to the underlying photoreceptor area 104 in an adjacent sensor pixel 102R. The hologram in the adjacent HOE pixel 612, in contrast, diffracts or refracts received radiation 620 into a first colored beam 612A in the second spectral band (e.g., red) to the underlying photoreceptor area 104R of the pixel 102R and a second colored beam 612B in the first spectral band (e.g., blue) to another adjacent blue sensor pixel 102B. The hologram in each HOE may also diffract or refract the red beam to yet another adjacent sensor pixel for detecting the red color.

In another embodiment 700 shown in FIG. 7, a HOE color filter array 710 on top of the pixel layers 110 may have each HOE pixel 711, 712 to spatially cover two or more sensor pixels. For example, the HOE pixel 711 covers three sensor pixels 721, 722, and 723 for red, blue, and green colors, respectively. The holograms in the HOE 711 diffracts or refracts input radiation into three separate beams in red, blue, and green separately to three separate sensor pixels, 721, 722, and 723, respectively. The hologram for diffracting and refracting red light in the HOE pixel 711 may vary spatially so that the red light received at the location above the sensor pixel 721 is directed into the sensor pixel 721 but red light received at locations above the sensor pixels 722 and 723 is also directed into the sensor pixel 721. The holograms in the HOE pixel 711 for the blue and green colors may also vary spatially in a similar manner to direct blue light into the pixel 722 and green light into the pixel 723.

It is contemplated that each HOE pixel may include holograms respectively for light focusing and color filtering. For example, the image devices 100, 300, and 400 in FIGS. 1, 3, and 4, respectively, may use HOE layers with both types of holograms to simultaneously focus radiation into different pixels and filter colors of the input radiation. In FIG. 1, each HOE pixel 122 may be fabricated to include another color filtering hologram as in the HOE pixel 411, 412, or 413 to also filter the selected color.

Alternatively, two separate HOE layers, one for color filtering and another for beam focusing, may be formed in a single image device. FIG. 8 shows an example wherein the HOE lens layer 120 in FIG. 1 is formed on top of the pixel layers 110 in the device 500 in FIG. 5 where the HOE color filter array layer 510 is formed between the pixel layers 110 and the substrate 101.

Diffractive HOE pixels can be designed to be relatively insensitive to variations in the input angles of the input beams so that a diffracted output beam can maintain its diffraction angle when the input angle varies. Thus, HOE color filtering layer or beam focusing layer may be formed of diffractive holograms for applications where the input beams tend to have different or varying input angles.

Only a few embodiments are disclosed. However, it is understood that variations and enhancements may be made without departing from the spirit of and are intended to be encompassed by the following claims.

What is claimed is:

1. A device, comprising:
   a substrate of a semiconductor material;
   an array of sensing pixels fabricated over said substrate, each sensing pixel being responsive to input radiation to produce a pixel output representative of received radiation by said sensing pixel, wherein said sensing pixels are formed of multiple pixel layers and at least one of said multiple pixel layers comprises an electrically conductive in-pixel circuit element; and
   an optical mask layer formed over said substrate in an optical path of the input radiation, said optical mask layer having a plurality of optical elements to modify a property of the input radiation prior to detection by said sensing pixels,
   wherein said electrically conductive in-pixel circuit element is formed over said optical mask layer.

2. The device as in claim 1, wherein said optical mask layer is formed over at least one layer of said multiple pixel layers.

3. The device as in claim 1, wherein said multiple pixels layers forming said sensing pixels are fabricated on said substrate, and wherein said optical mask layer is between said multiple pixel layers and said substrate.

4. The device as in claim 1, wherein multiple pixel layers forming said sensing pixels include a first set of contiguous multiple pixel layers and a second set of contiguous pixel layers fabricated on said substrate, and wherein said optical mask layer is formed between said first set and said second set.

5. The device as in claim 1, wherein each optical element focuses the input radiation to a corresponding sensing pixel underneath said each optical element.

6. The device as in claim 5, wherein said sensing pixels are formed of a first set of contiguous multiple pixel layers and a second set of contiguous pixel layers fabricated on said substrate, and wherein said optical mask layer is formed between said first set and said second set.

7. The device as in claim 1, wherein each optical element selectively separates one color in the input radiation from another different color in the input radiation.

8. The device as in claim 7, wherein said optical mask layer is between said multiple pixel layers and said substrate.

9. The device as in claim 7, wherein each optical element spatially covers only one sensing pixel.

10. The device as in claim 7, wherein each optical element covers at least two adjacent sensing pixels.

11. The device as in claim 1, wherein each sensing pixel is an active pixel which has in-pixel circuit elements to convert radiation-induced charge into a current or voltage.

12. The device as in claim 1, wherein each optical element spatially covers only one sensing pixel.

13. The device as in claim 1, wherein each optical element spatially covers at least two adjacent sensing pixels.

14. The device as in claim 1, wherein each optical element both focuses a beam and spectrally filters the same beam.

15. The device as in claim 1, wherein each optical element is optically absorptive.

16. The device as in claim 1, wherein each optical element is optically reflective.

17. The device as in claim 1, wherein each optical element is optically refractive or diffractive.

18. A device, comprising:
    a substrate of a semiconductor material;
    a plurality of pixel layers formed over said substrate and patterned to define an array of sensing pixels, each sensing pixel being responsive to input radiation to produce a pixel output representative of received radiation by said sensing pixel;
    a first optical mask layer formed over said substrate in an optical path of the input radiation, said first optical mask layer having a plurality of optical elements to optically interact with the input radiation; and
    a second optical mask layer formed between said first optical mask layer and said substrate, said second optical mask layer separated from said first optical mask layer by a set of contiguous pixel layers and having a plurality of optical elements to optically interact with the input radiation that passes through said first optical mask layer,
    wherein said contiguous pixel layers separating the first and second optical mask layers comprise electrically conductive in-pixel circuit elements.

19. The device as in claim 18, wherein each optical element in said first and second optical mask layers focuses received radiation.

20. The device as in claim 18, wherein each optical element in said first optical mask layer focuses received radiation and each optical element in said second optical mask layer separates one color from another different color in the input radiation.

21. The device as in claim 18, wherein said second optical mask layer is formed between said pixel layers and said substrate, and said first optical mask layer is formed over said pixel layers.

22. The device as in claim 18, wherein each sensing pixel is an active pixel which has in-pixel circuit elements to convert radiation-induced charge into a current or voltage.

23. A device, comprising:
    a substrate of a semiconductor material;
    an array of sensing pixels fabricated over said substrate, each sensing pixel being responsive to input radiation to produce a pixel output representative of received radiation by said sensing pixel; and
    an optical mask layer formed over said substrate in an optical path of the input radiation, said optical mask layer having a plurality of optical elements to modify a property of the input radiation prior to detection by said sensing pixels, wherein each optical element both focuses a beam and spectrally filters the same beam,
    wherein said sensing pixels are formed of multiple pixel layers comprising electrically conductive in-pixel circuit elements and at least one of said pixel layers is formed over said optical mask layer.

24. The device as in claim 23, wherein each optical element spatially covers only one sensing pixel.

25. The device as in claim 23, wherein each optical element spatially covers at least two adjacent sensing pixels.

26. The device as in claim 23, wherein said sensing pixels are formed of a first set of contiguous multiple pixel layers and a second set of contiguous pixel layers fabricated on said substrate, and wherein said optical mask layer is formed between said first set and said second set.

27. The device as in claim 23, wherein each sensing pixel is an active pixel which has in-pixel circuit elements to convert radiation-induced charge into a current or voltage.

28. The device as in claim 23, wherein each optical element spatially covers only one sensing pixel.

29. The device as in claim 23, wherein each optical element spatially covers at least two adjacent sensing pixels.

30. An imager, comprising:
a plurality of pixel cells configured to convert incident light into an electrical signal, each pixel cell comprising a plurality of pixel layers; and
an optical layer between two of said plurality of pixel layers, the two pixel layers each containing an electrically conductive in-pixel circuit element,
wherein said optical layer comprises a plurality of optical elements, each configured to focus the incident light on a respective pixel cell.

31. The imager of claim 30, wherein the optical layer comprises a plurality of optical elements, each configured to spectrally filter the incident light prior to conversation by the pixel cells.

32. The imager of claim 30, wherein the optical layer is further configured to separate the incident light into constituent colors.

33. The imager of claim 32, wherein the optical layer is further configured to focus each color of the incident light onto a respective pixel cell.

* * * * *

UNITED STATES PATENT AND TRADEMARK OFFICE
CERTIFICATE OF CORRECTION

PATENT NO.      : 7,609,308 B2                              Page 1 of 1
APPLICATION NO. : 10/814176
DATED           : October 27, 2009
INVENTOR(S)     : Scott Patrick Campbell It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1383 days.

Signed and Sealed this

Twelfth Day of October, 2010

David J. Kappos
*Director of the United States Patent and Trademark Office*